(12) United States Patent  
Higashikozono et al.

(10) Patent No.: US 7,365,965 B2  
(45) Date of Patent: Apr. 29, 2008

(54) TERMINAL BOX FOR A SOLAR BATTERY MODULE, A RECTIFYING-DEVICE UNIT

(75) Inventors: Makoto Higashikozono, Yokkaichi (JP); Hiroyuki Yoshikawa, Yokkaichi (JP); Masuhiro Kiryu, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 297 days.

(21) Appl. No.: 11/120,301

(22) Filed: May 2, 2005

(65) Prior Publication Data

US 2005/0197001 A1      Sep. 8, 2005

(30) Foreign Application Priority Data

| | | |
|---|---|---|
| May 7, 2004 | (JP) | 2004-138951 |
| Aug. 3, 2004 | (JP) | 2004-227030 |
| Nov. 9, 2004 | (JP) | 2004-325246 |

(51) Int. Cl.
H05K 7/20 (2006.01)
H01R 12/00 (2006.01)

(52) U.S. Cl. ............ 361/641; 361/704; 361/710; 257/719; 439/76.2

(58) Field of Classification Search ............. 361/641
See application file for complete search history.

(56) References Cited

U.S. PATENT DOCUMENTS

| | | | | |
|---|---|---|---|---|
| 4,899,256 | A | * | 2/1990 | Sway-Tin ............. 361/715 |
| 4,972,295 | A | * | 11/1990 | Suguro et al. ......... 361/706 |
| 5,140,500 | A | * | 8/1992 | Klein et al. .......... 361/707 |
| 5,761,038 | A | * | 6/1998 | Tanaka ............... 361/700 |
| 6,434,005 | B1 | * | 8/2002 | Vinciarelli et al. ..... 361/704 |
| 6,494,723 | B2 | * | 12/2002 | Yamane et al. ........ 439/76.2 |
| 6,655,987 | B2 | | 12/2003 | Higashikozono et al. |
| 6,671,173 | B2 | * | 12/2003 | Ashiya et al. ......... 361/704 |
| 6,785,139 | B2 | * | 8/2004 | Onizuka et al. ........ 361/704 |
| 6,948,950 | B2 | * | 9/2005 | Yamaguchi ............ 439/76.2 |

FOREIGN PATENT DOCUMENTS

JP        3498945        2/2004

* cited by examiner

Primary Examiner—Gregory D Thompson
(74) Attorney, Agent, or Firm—Gerald E. Hespos; Anthony J. Casella

(57) ABSTRACT

A terminal box for a solar battery module is provided with a plurality of terminal plates (30) juxtaposed on a base plate (11) and connectable with positive and negative electrodes of the solar battery module, cables for external connection connectable with the terminal plates (30), and rectifying-device units (50) each of which spans between two corresponding terminal plates (30). Each rectifying-device unit (50) includes a bypass diode (52) connectable with the two corresponding terminal plates (30) to prevent an inverse current, and a metal-made clip (53) for resiliently holding the bypass diode (52). The clip (53) is held in contact with a heat discharging plate (55) of the bypass diode (52) to discharge heat generated by the bypass diode (52).

8 Claims, 16 Drawing Sheets

TERMINAL BOX FOR A SOLAR BATTERY MODULE, A RECTIFYING-DEVICE UNIT

BACKGROUND OF THE INVENTION

1. Field of the Invention

The invention relates to a terminal box for a solar battery module and a rectifying-device unit.

2. Description of the Related Art

A solar energy generation system is constructed to supply direct-current electricity from a solar battery panel on the roof of a building to electric equipment via an inverter or the like. The solar battery panel has a plurality of solar battery modules, and electrodes of the solar battery modules are connected in series or in parallel via terminal boxes.

Japanese Patent Publication No. 3498945 discloses a terminal box that has terminal plates arranged adjacent to each other in a box. Ends of the terminal plates at one side are connectable with positive and negative electrodes drawn out from the underside of the solar battery module. The other ends of the terminal plates are connectable with cables for external connection. Bypass diodes span between adjacent terminal plates for shorting an inverse current at the time of an inverse load from one cable for external connection to the other. Each bypass diode has a chip-shaped diode functioning portion and two conductor pieces connect with the diode functioning portion while holding the diode functioning portion therebetween. The conductor pieces extend in opposite directions from the contacts with the diode functioning portion. Extending ends of the conductor pieces are connected with the corresponding terminal plates, for example, by soldering.

Heat generated by the above-described diode functioning portion cannot be discharged efficiently. Some known diodes packaged by resin sealing have heat-discharging plates for discharging the heat. However, the heat discharging plates are not very large, and it has been difficult to ensure sufficient heat discharging characteristics only by the heat-discharging plates.

The present invention was developed in view of the above problem and an object thereof is to ensure good heat discharging characteristics.

SUMMARY OF THE INVENTION

The invention relates to a terminal box for a solar battery module. The terminal box has a base plate. Terminal plates are provided on the base plate and are connectable with positive and negative electrodes of the solar battery module via cables. A rectifying-device unit spans between two terminal plates and has at least one rectifying device for bypass during an inverse load. The rectifying device is connectable with each of the two corresponding terminal plates. A heat-discharging member contacts the rectifying device.

The heat-discharging member preferably is made of metal and contacts the rectifying device. Thus, the heat-discharging member efficiently discharges heat generated by the rectifying device. Further, the rectifying device and the heat-discharging member preferably are united integrally into the rectifying-device unit for easy mounting on the base plate.

The heat-discharging member preferably has two supports for resiliently holding the rectifying device therebetween. Thus, the heat-discharging member can accommodate rectifying devices of different sizes, thereby realizing better versatility. Further, disposition of the rectifying device between the two supports can reduce the operating load. Of course, soldering may be applied between the rectifying device and the supports or a heat-discharging pad made of a metal may be provided therebetween to enhance heat-discharging characteristics.

The rectifying device preferably is packaged by resin sealing with a heat-discharging portion exposed at an outer surface, and the heat-discharging member can contact the heat-discharging portion. Thus, a heat transfer from the heat-discharging portion to the heat-discharging member is better.

The heat-discharging member preferably has at least one engaging portion resiliently engaging at least one engageable portion of the base plate. The rectifying-device unit is held on the base plate by resilient engagement of the engaging portion and the engageable portion. Thus, the rectifying-device unit can be mounted on the base plate through a one-touch operation.

Plural rectifying devices may be provided on the base plate, and one heat-discharging member is provided for each rectifying device. Thus, the rectifying-device unit can be mounted on the base plate in more diverse manners than when one heat-discharging member collectively holds plural rectifying devices. For example, the rectifying-device unit can connect some adjacent terminal plates and jumper pins can connect others.

Alternatively, plural rectifying devices may be provided on the base plate and may be held collectively by the one heat-discharging member. Thus, it is not necessary to provide one heat-discharging member for each rectifying device and the rectifying devices can be mounted easily.

The rectifying device preferably is packaged by resin sealing. The heat-discharging member preferably extends along a step of the rectifying device and has a holding surface to abut against the step. Thus, a heat discharging area is increased and joining strength of the rectifying device and the heat-discharging member is increased.

The heat-discharging member may include a boss to be inserted into a hole of the rectifying device for mounting the rectifying device on the heat-discharging member. Thus, the rectifying device can be mounted easily.

The heat-discharging member may have two divided members. The divided members can be united to hold the rectifying device tightly. Thus, the rectifying device can be held more securely.

The divided members preferably have through holes that penetrate the divided members where the rectifying device is held. A screw is inserted through the through holes and is screwed into the base plate to fasten the rectifying device. Thus, the rectifying device is held securely and is fixed to the base plate as the rectifying device is fastened. The rectifying device also may be mounted on the heat discharging-member by a screw.

A through hole may be formed in a surface of the base plate and may communicate with the solar battery module. A portion the heat-discharging member may be placed in the through hole to discharge heat generated by the rectifying device efficiently towards the solar battery module.

A heat-discharging block may be integral or unitary to the heat-discharging member for discharging heat generated by the rectifying device efficiently towards the solar battery module. An end surface of a heat-discharging block may face a surface of the base plate to be mounted on the solar battery module. Thus, heat generated by the rectifying device can be discharged directly from the heat-discharging block towards the solar battery module. Further, in the case of adhering the base plate to the solar battery module, an amount of adhesive to be applied can be reduced.

The heat-transferring portion may use an adhesive with good heat conductivity. Thus, adhesive applied to the lower surfaces of the heat-discharging member and the base plate may be the heat-transferring portion. Adhesive having good heat conductivity means an adhesive having a higher heat conductivity than the base plate. For example, a ceramic adhesive, an epoxy adhesive or the like can be used.

The heat-discharging member preferably has a heat dissipation portion, such as at least one fin, for discharging heat. Thus, a heat discharging outer surface is increased and airflow is better.

The heat-discharging member preferably is made of a metal having high heat conductivity, such aluminum or an aluminum alloy.

The invention also relates to a rectifying-device unit spanning between two terminal plates on or near a base plate. The terminal plates are connectable with positive and negative electrodes of a solar battery module and are connectable with cables for external connection. The rectifying-device unit has a rectifying device connected with each of the two terminal plates and a heat-discharging member for contacting the rectifying device. The heat-discharging member efficiently discharges heat generated by the rectifying device. Further, mounting onto the base plate is easy since the rectifying device and the heat-discharging member are united in the rectifying-device unit.

The heat-discharging member may have two supporting pieces for resiliently holding the rectifying device therebetween. Thus, the heat-discharging member can accommodate rectifying devices of different sizes, thereby realizing better versatility. Further, the ability to hold the rectifying device between two supporting pieces reduces the operation load. Of course, soldering may be applied between the rectifying device and the supporting pieces or a heat discharging pad made of a metal may be provided therebetween. This further betters heat discharging characteristics.

The rectifying device preferably is packaged in resin with a heat-discharging portion exposed at its outer surface. Thus, the heat-discharging member can contact the heat discharging portion. Thus, heat transfer from the heat-discharging portion to the heat-discharging member is better.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

Figure 1:
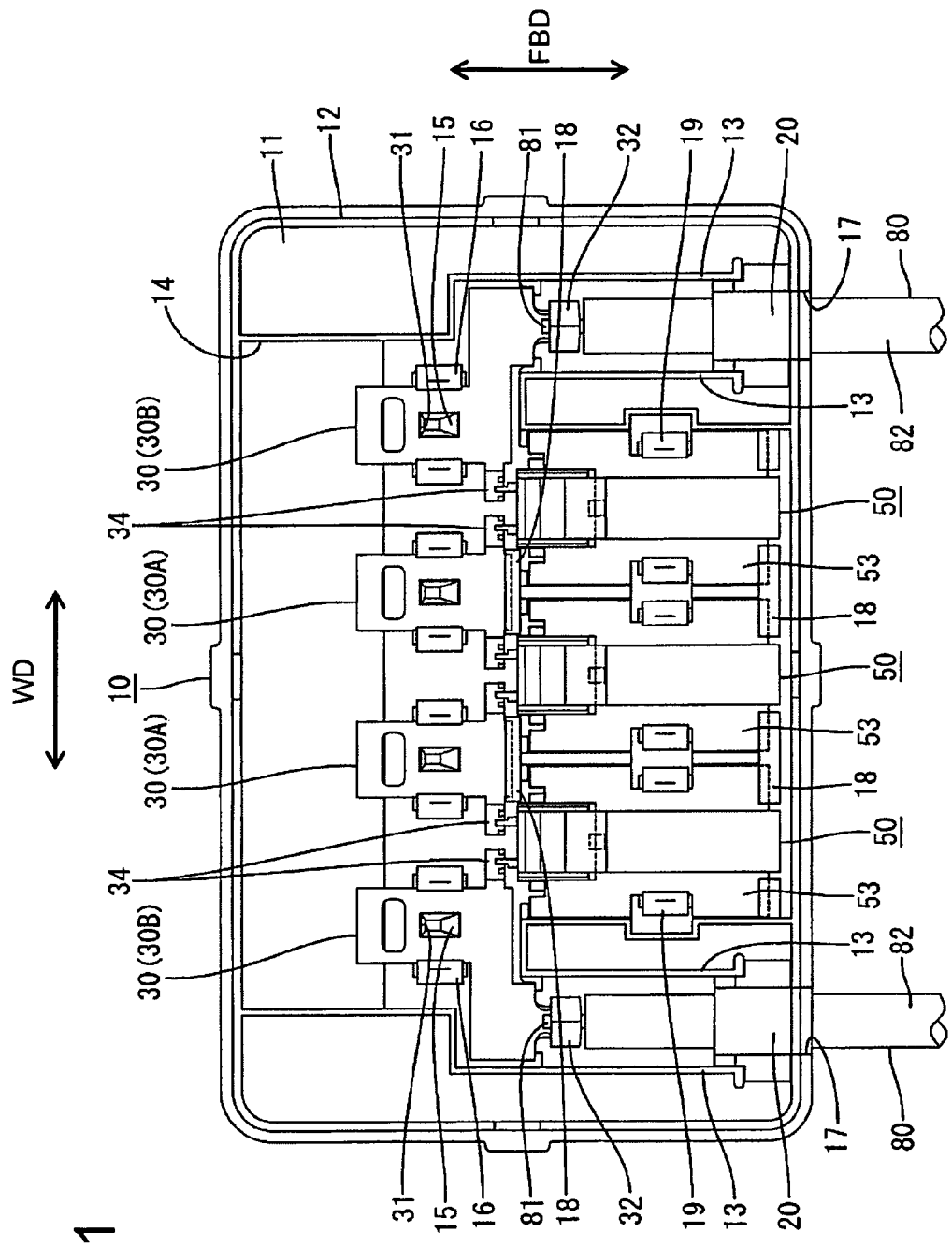
FIG. 1 is a plan view showing an internal construction of a box main body according to a first embodiment of the invention.

A first embodiment of the invention is described with reference to FIGS. 1 to 6. A terminal box for a solar battery module according to this embodiment is mountable on a side of a solar battery module (not shown) having a multitude of solar battery cells connected in series arranged on the outer surface thereof. The terminal box has a box main body 10, terminal plates 30 in the box main body 10 and rectifying-device units 50 spanning between adjacent terminal plates 30. In the following description, the upper side of FIG. 1 is referred to as the front along forward and backward directions FBD.

The box main body 10 is made e.g. of a synthetic resin to define a substantially box shape with an open top. An insulating resin is filled in the box main body 10 and a cover 70 is mountable from above to cover the opening. The box main body 10 has a substantially rectangular base plate 11, and the terminal plates 30 are arranged substantially side by side on the base plate 30. A side plate 12 stands up from the outer peripheral edge of the base plate 11 to surround the base plate 11 and partition walls 13 stand up from the base plate 11, as shown in FIG. 1. A wide substantially rectangular opening 14 is formed at one end of the base plate 11, and leading ends of a plurality of the terminal plates 30 are located in the opening 14. Leads (not shown) to be connected with positive and negative electrodes of the solar battery module are introduced through the opening 14 of the base plate 11 for connection with the leading ends of the terminal plates 30, for example, by soldering, ultrasonic welding, press-fitting, insulation displacement connection or the like.

Positioning projections 15 project from the upper surface of the base plate 11 and are disposed for engaging positioning holes 31 of the terminal plates 30. Two resiliently deformable locking pieces 16 project at opposite outer sides of each positioning projection 15. The locking pieces 16 deform to widen the spacing therebetween in the process of mounting the terminal plate 30. The locking pieces 16 restore as the terminal plate 30 is mounted properly to press the lateral edges of the terminal plate 30 from above to prevent the terminal plate 30 from moving up and away from the base plate 11.

Positioning walls 18 are provided on the upper surface of the base plate 11. The positioning walls 18 extend substantially along the width direction WD and substantially normal to the forward and backward directions FBD of the corresponding terminal plate 30A. The base end of each positioning wall 18 has a receiving groove (not shown) for receiving the rear end of the terminal plate 30A. The terminal plate 30A is aligned oblique to the base plate 11 with the rear end of the terminal plate 30A against the back surface of the receiving groove as the terminal plate 30A is being mounted. The terminal plate 30A then is inclined to bring the front end down towards the base plate 11 so that the positioning hole 31 engages the positioning projection 15.

Notches 17 are formed at opposite ends of the rear side of the side plate 12. Cables 80 for external output are fit in the notches 17 from above and cable pressing members 20 fix the respective cables 80. The fitted cable pressing members 20 are integrally continuous with the side plate 12.

The terminal plates 30 are formed by cutting or stamping an electrically conductive metal plate into a specified shape. The terminal plates 30 are arranged substantially side by side in an intermediate portion of the base plate 11 with respect to forward and backward directions FBD. Terminal plates 30B at opposite ends of the base plate 11 are connected with the cables 80. An insulation coating 82 is stripped at an end of each cable 80 to expose a core 81, and a barrel 32 at an end of the terminal plate 30 is crimped, bent or folded into connection with the core 81 to connect the cable 80 and the terminal plate 30. An extending end of the cable 80 is connected e.g. with a connector portion or electric/electronic device (not shown).

Each terminal plate 30B that is connected with the cable 80 is offset at an intermediate longitudinal position to correspond to the positions of the cable 80 and the lead. The partition walls 13 extend substantially along the opposite lateral edges of the terminal plates 30 and the cables 80 to define a resin-filling space, and the insulating resin is filled at least partly into the resin-filling space (i.e. onto the terminal plates 30 and the cables 80 inside the partition walls 13). In this way, the amount of filled insulating resin is less than a case where the insulating resin is filled into the entire box main body 10.

Figure 3:
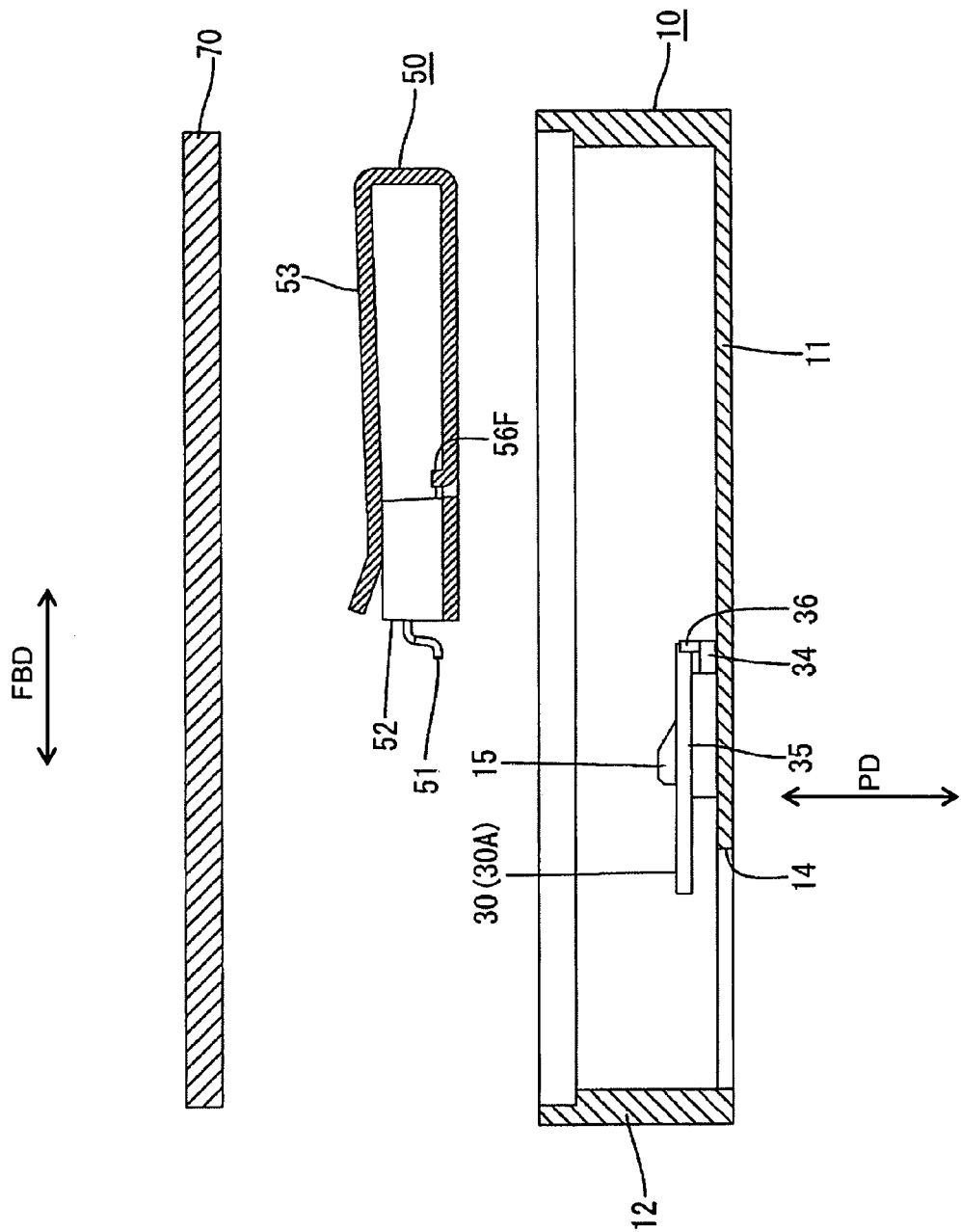
FIG. 3 is a schematic exploded section of the box main body.
Figure 4:
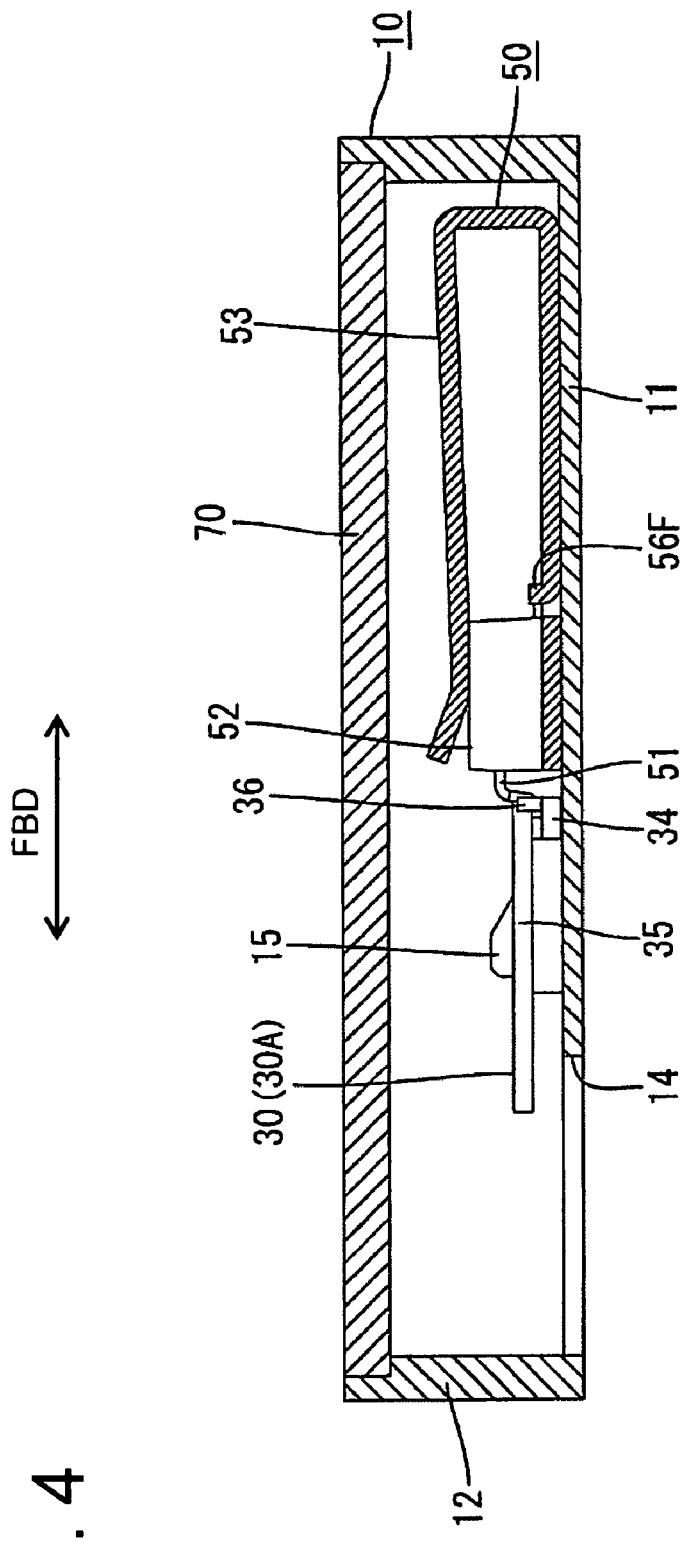
FIG. 4 is a schematic section of the box main body.
Figure 5:
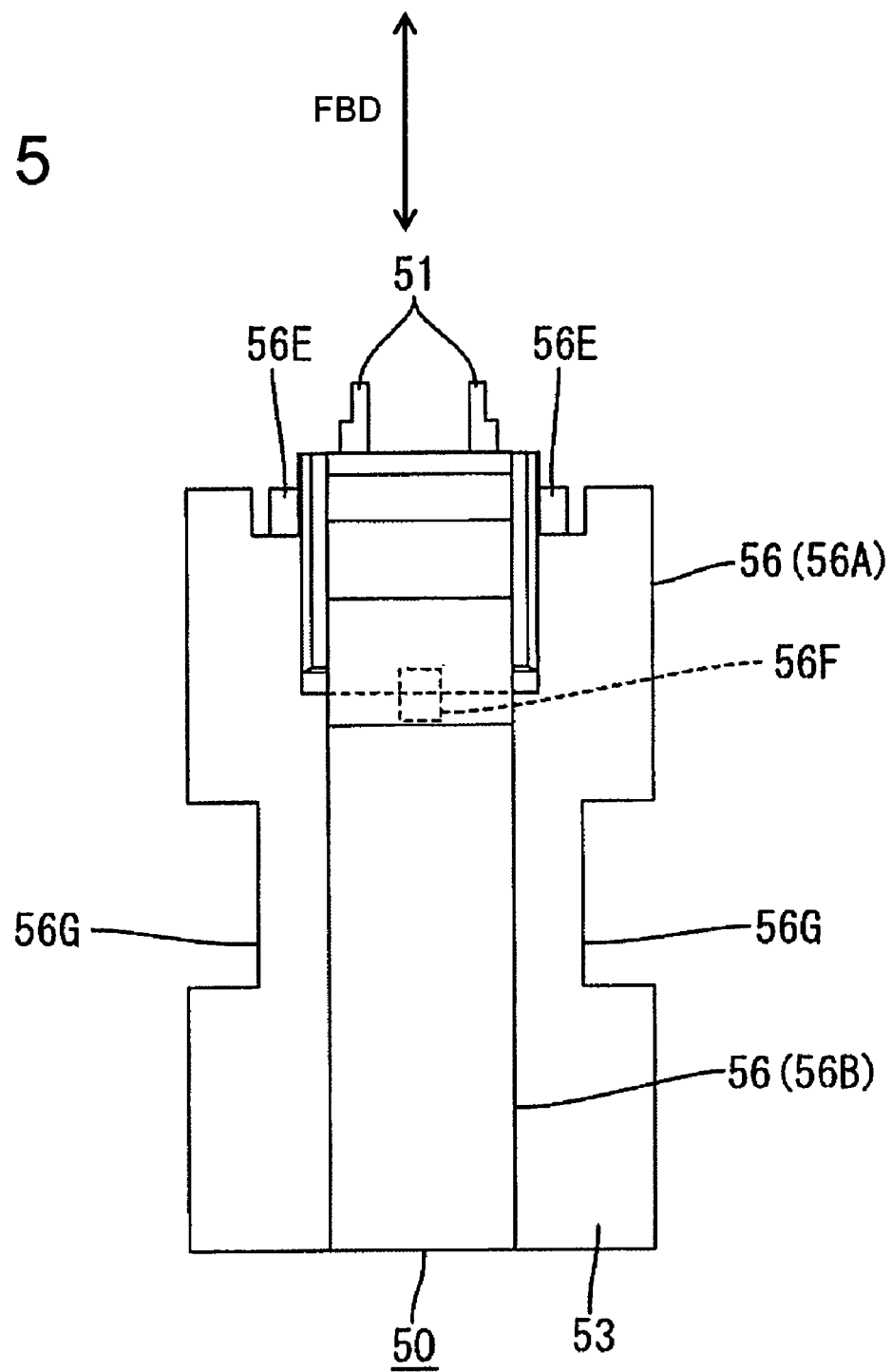
FIG. 5 is a plan view of a rectifying-device unit.

Terminal plates 30A that are not connected with the cables 80 are in intermediate portions of the upper surface of the base plate 11 and between the terminal plates 30B. Each terminal plate 30 is engageable with the positioning wall 18 and the positioning projections 15 on the base plate 11 to prevent each terminal plate 30 from moving loosely along a plane direction. Attachments 34 bulge out sideways from the terminal plates 30 and are slightly lower along a plane direction PD than main portions 35 to be connected with the leads. Thus, the attachments 34 correspond to the positions of the conductor pieces 51, as shown in FIGS. 3 and 4. Protrusions 36 are provided on the upper surface of each attachment 34 for guiding the conductor pieces 51.

Each rectifying-device unit 50 arranged between adjacent terminal plates 30 is comprised of a bypass diode 52 for preventing the reverse flow of a current, and a clip 53 for resiliently holding the bypass diode 52.

Figure 6:
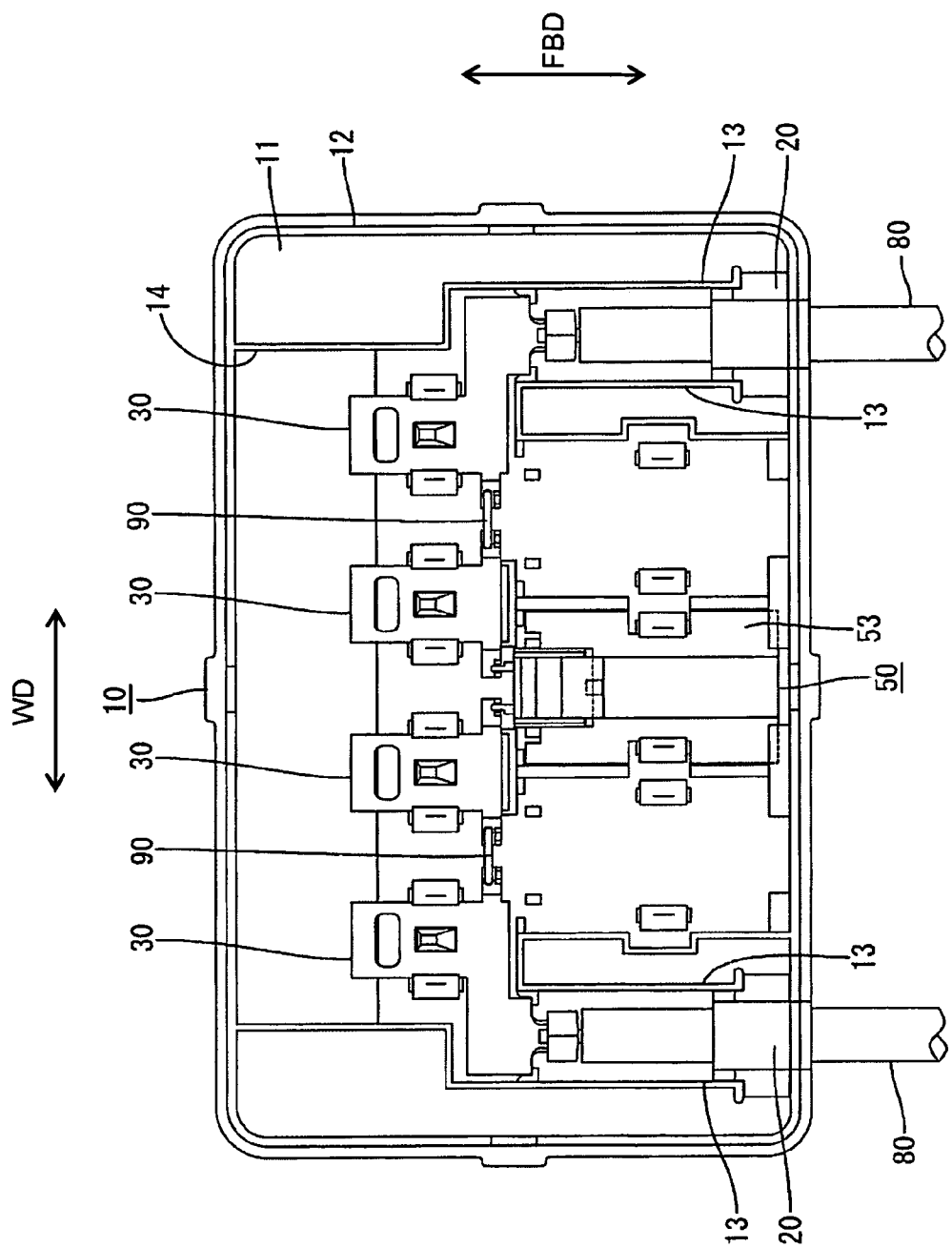
FIG. 6 is a view corresponding to FIG. 1 showing a modification.

Three rectifying-device units 50 are illustrated. However, the volume of the terminal box for the solar battery module and other factors determines the number of the rectifying-device units 50. The terminal plates 30 at the opposite ends of the base plate 11 may be connected electrically with the adjacent terminal plate 30 by jumper pins 90 and the rectifying-device unit 50 may span only between one pair of terminal plates 30 located in an intermediate position, as shown in FIG. 6. Then, the number of the bypass diodes 52 is reduced to suppress a temperature increase, and a heat transfer property is better by transferring heat by way of the terminal plates 30. Of course, the two pairs of terminal plates 30 at the opposite ends of the base plate 11 may be connected with the adjacent terminal plate 30 via the rectifying-device units 50 and one pair of terminal plates 30 in the middle may be connected via the jumper pin.

Figure 2A:
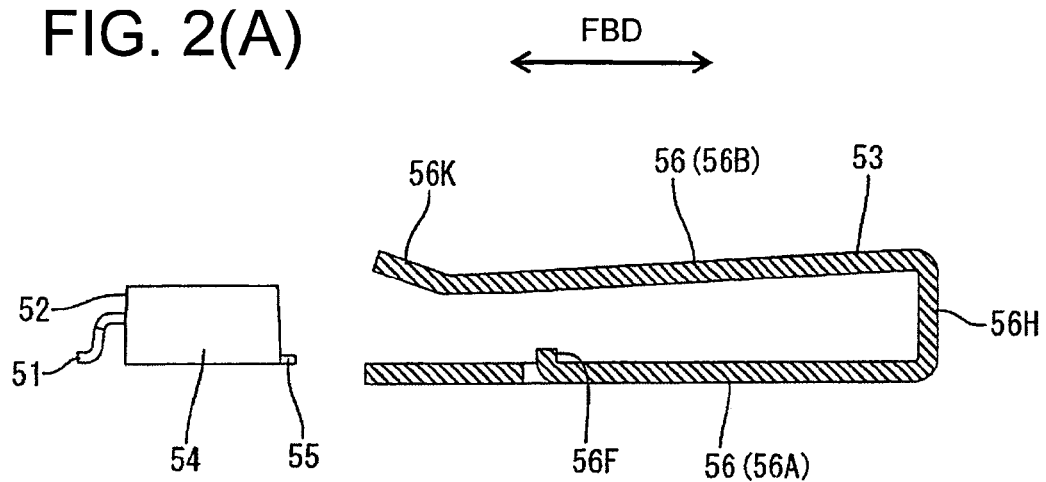
FIGS. 2(A) and 2(B) are sections of a clip before and after a bypass diode is mounted therein.

As shown in FIG. 2(A), the bypass diode 52 includes a resin-molded portion 54 with a substantially rectangular parallelepipedic shape. Two conductor pieces 51 project substantially from the middle of the front end surface of the resin-molded portion 54. The conductor pieces 51 correspond to a P-area (anode side) and an N-area (cathode side) and are connected with the corresponding terminal plates 30 by soldering, welding, press-fitting or the like. The bypass diode also has a heat discharging plate 55 that corresponds to the N-area (cathode side). A part of the heat discharging plate 55 projects back from the bottom edge of the rear end surface of the resin-molded portion 54 and most of the remaining part of the heat discharging plate 55 is exposed at the bottom of the resin-molded portion 54. The conductor pieces 51 project substantially horizontally from one end surface of the resin-molded portion 54 and then are bent twice at substantially right angles. Thus, leading ends of the conductor pieces 51 reach positions substantially at the same height as the bottom surface of the resin-molded portion 54 and face away from the resin-molded portion 54 and substantially parallel to the terminal plates 30.

The clip 53 is formed by bending, folding or embossing an electrically conductive metal plate of, e.g. an oxygen free copper, that is stamped or cut into a substantially symmetrical shape with respect to an axis extending along forward and backward directions FBD. The clip 53 has a substantially U-shape with two opposed supports 56 that resiliently hold the bypass diode 52 therebetween, as shown in FIGS. 2 to 5. The support 56A closer to the base plate 11 contacts the bottom surface of the bypass diode 52 and has a length along forward and backward directions FBD that is more than about twice, more preferably about four times the corresponding dimension of the bypass diode 52. This lower support 56A extends back until the rear end thereof reaches the rear end of the base plate 11.

The lower support 56A is wider than the bypass diode 52 and preferably about twice as wide as the bypass diode 52. Lateral displacement preventing pieces 56E are cut and bent at the front edge of the lower supporting piece 56A and contact opposite side surfaces of the bypass diode 52 to prevent loose movements of the bypass diode 52 along the width direction WD. A stop 56F is cut and bent in a widthwise intermediate position of the lower support 56A and contacts the rear end of the heat discharging plate 55 to prevent backward movement of the bypass diode 52. Substantially U-shaped notches 56G are formed at opposite lateral edges of the lower support 56A. The engageable projections 19 of the base plate 11 contact edges of the notches 56G and deform resiliently in the process of mounting the rectifying-device unit 50 on the base plate 11. The engageable projections 19 restore to contact upper edges of the notches 56G as the lower support 56A is placed on the base plate 11. Thus upward movement of the rectifying-device unit 50 away from the base plate 11 is prevented.

An intermediate coupling 56H projects at an intermediate position of the rear edge of the lower support 56A, and the upper support 56B extends forward from the upper end of the intermediate coupling 56H for contacting the upper surface of the bypass diode 52. The intermediate coupling 56H and the upper support 56B are slightly narrower than the bypass diode 52. Further, the upper support 56B slopes down and forward towards the lower support 56A from the intermediate coupling 56H and contacts the bypass diode 52 at an end of the sloped part thereof. The upper support 56B slopes up and away from the lower support 56A, thereby widening the spacing to the lower supporting piece 56A. The sloped-up leading end of the upper support 56B defines a guide 56K for guiding the bypass diode 52 and/or for guiding a resilient deformation of the support 56. The space between the end of the sloped-down part 56K of the upper support 56B and the lower support 56A in a natural state is slightly shorter than the height or corresponding dimension of the bypass diode 52.

Positioning walls 18 project at the rear end of the base plate 11, and opposite ends of the rear end of the lower support 56A fit into receiving grooves (not shown) at base ends of the positioning walls 18. The rectifying-device unit 50 is held in an oblique posture during mounting on the base plate 11 to bring opposite ends of the rear end of the lower support 56A into contact with the bottom surface of the receiving groove. The rectifying-device unit 50 then is inclined to bring the front end of the lower support 56A towards the base plate 11 to place the conductor pieces 51 on the corresponding terminal plates 30.

The terminal box for a solar battery module is assembled by crimping, bending or folding the barrels 32 of the terminal plates 30 into connection with the cores 81 exposed at the ends of the corresponding cables 80. The terminal plates 30 then are placed on the base plate 11 so that the positioning projections 15 on the base plate 11 enter the respective positioning holes 31 of the terminal plates 30 to position the terminal plates 30. The resilient locking pieces 16 prevent the terminal plates 30 from moving away from the base plate 11. Subsequently, the cable pressing members 20 are mounted from above and substantially cover the cables 80 to fix the cables 80 onto the base plate 11. Further, the terminal plates 30A not connected with the cables 80 have the rear ends fit into the receiving grooves of the positioning walls 18.

Figure 2B:
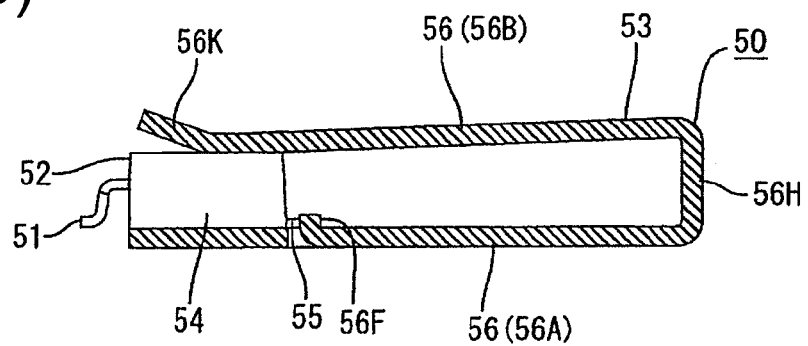

As shown in FIGS. 2(A) and 2(B), the bypass diode 52 is fit into an opening of each clip 53 from the front to sandwich the bypass diode 52 resiliently between the leading ends of a pair of supports 56A, 56B, and to form the rectifying-device unit 50. The heat discharging characteristics from the heat discharging plate 55 to the clip 53 may be improved by applying solder and/or providing a metal heat discharging part between the heat discharging plate 55 of the bypass diode 52 and the lower support 56A of the clip 53. Subsequently, opposite ends of the rear end of each lower supporting piece 56A are fit into the receiving groove of the corresponding positioning wall 18. Each pair of conductor pieces 51 are placed respectively on the attachments 34 of the corresponding terminal plates 30 and solder is applied to connect the conductor pieces 51 and the terminal plates 30 electrically. Of course, other means such as welding may connect the conductor pieces 51 and terminal plates 30. Further, upward movement of the lower supports 56A or the rectifying-device units 50 away from the base plate 11 are prevented by the resilient engagement of the lower supports 56A with the engageable portions 19.

The box main body 10 then is mounted to the underside of the solar battery module using an adhesive double coated tape, bolts or the like. In the mounting process, the leads connected with the electrodes of the solar battery module are drawn through the opening 14 of the base plate 11 and into the box main body 10 for soldered connection with the leading ends of the terminal plates 30. Insulating resin, such as a silicone resin, then is filled onto the ends of the terminal plates 30 and the cables 80 inside the partition walls 13. The cover 70 then is mounted to close the box main body 10. The crimp-connected parts, the solder-connected parts and the like connected parts thus are sealed airtight by the insulating resin. Further, the rear surface of the cover 70 presses the cable pressing members 20 against the base plate 11.

As described above, the metal clip 53 contacts and holds the bypass diode 52. Thus, heat generated by the bypass diode 52 is discharged efficiently by way of the clip 53. Further, the bypass diode 52 and the clip 53 are united integrally into the rectifying-device unit 50 to provide efficient mounting onto the base plate 11.

The clip 53 has two supports 56A, 56B to hold the bypass diode 52 resiliently. Thus, the clip 53 can hold bypass diode 52 and bypass diodes of different sizes, thereby providing better versatility.

Further, it is sufficient for the edges of the notches 56G of the lower support 56A to engage resiliently with the engageable portions 19 while the rear end of the lower support 56A is fit into the receiving groove of the positioning wall 18. Thus, the rectifying-device unit 50 can be mounted on the base plate 11 through a one-touch operation, thereby reducing an operation load.

Furthermore, one clip 53 is provided for each bypass diode 52. Thus, the rectifying-device units 50 can be mounted on the base plate 11 in more diverse manners, as shown in FIG. 6, as compared to a case where a plurality of bypass diodes 52 are held by one clip 53.

Figure 7:
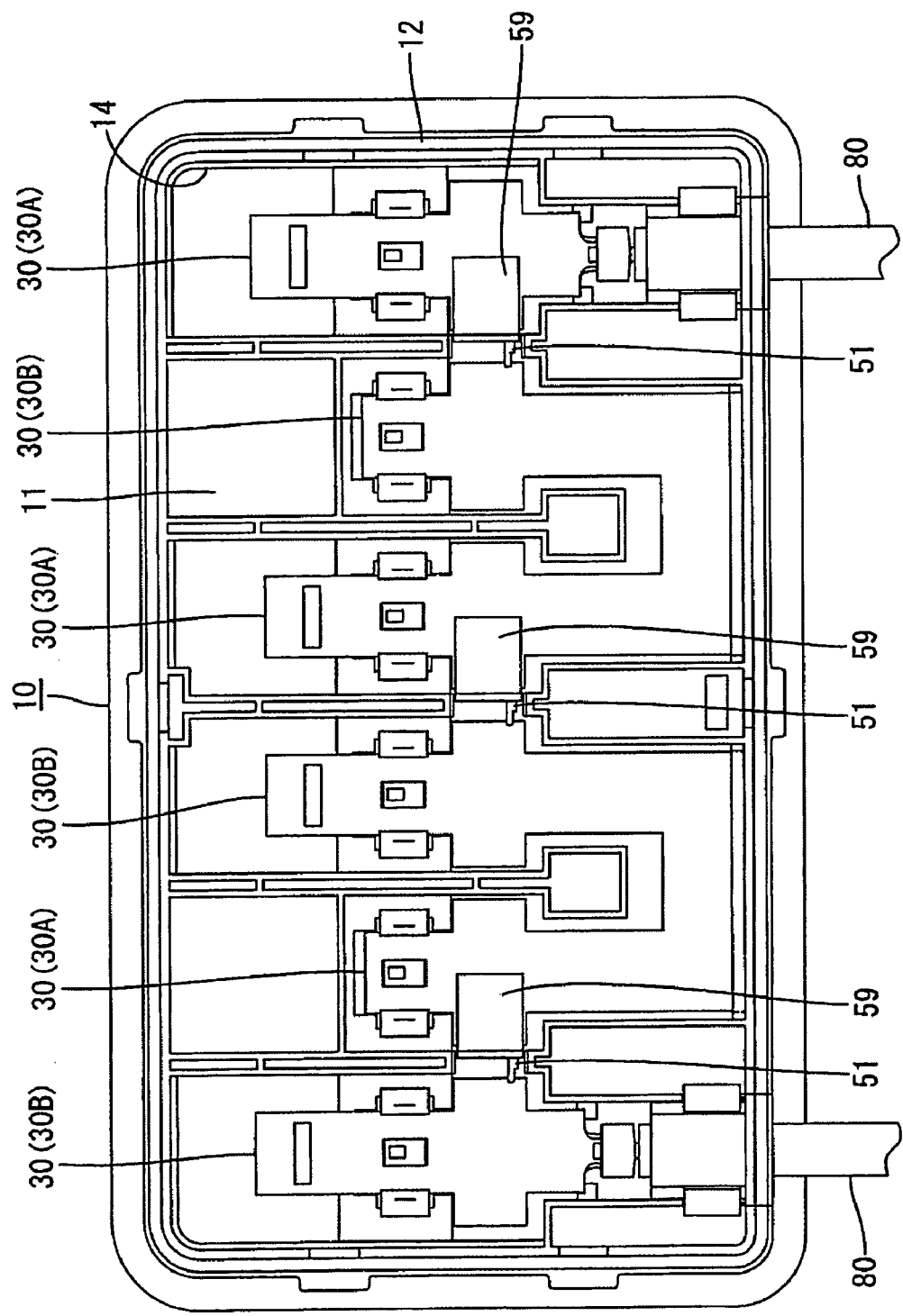
FIG. 7 is a view corresponding to FIG. 1 showing a reference example.

FIG. 7 shows an example of the invention where a bypass diode 59 is formed by cutting off one conductor plate 51 corresponding to the N-area (cathode) in the bypass diode 52 of the foregoing embodiment. Specifically, the bypass diode 59 has a heat discharging plate (not shown) corresponding to the N-area (cathode side) on the bottom surface thereof and a conductor plate 51 corresponding to the P-area (anode side) on one end surface thereof, and spans between adjacent terminal plates 30 with the one end surface faced leftward. In the shown case, three bypass diodes 50 are arranged in series while bridging the respective terminal plates 30. The heat discharging plate and the leading end of the conductor plate 51 are connected with the corresponding terminal plates 30A, 30B by being placed directly on one of the adjacent terminal plates 30A and directly placed on the other terminal plate 30B.

According to this example, heat generated by the bypass diode 59 can be discharged directly from the heat discharging plate to the terminal plate 30A. Thus, heat discharging characteristics are better as compared to prior art bypass diodes on which heat discharging plates are placed on base plates.

Figure 8:
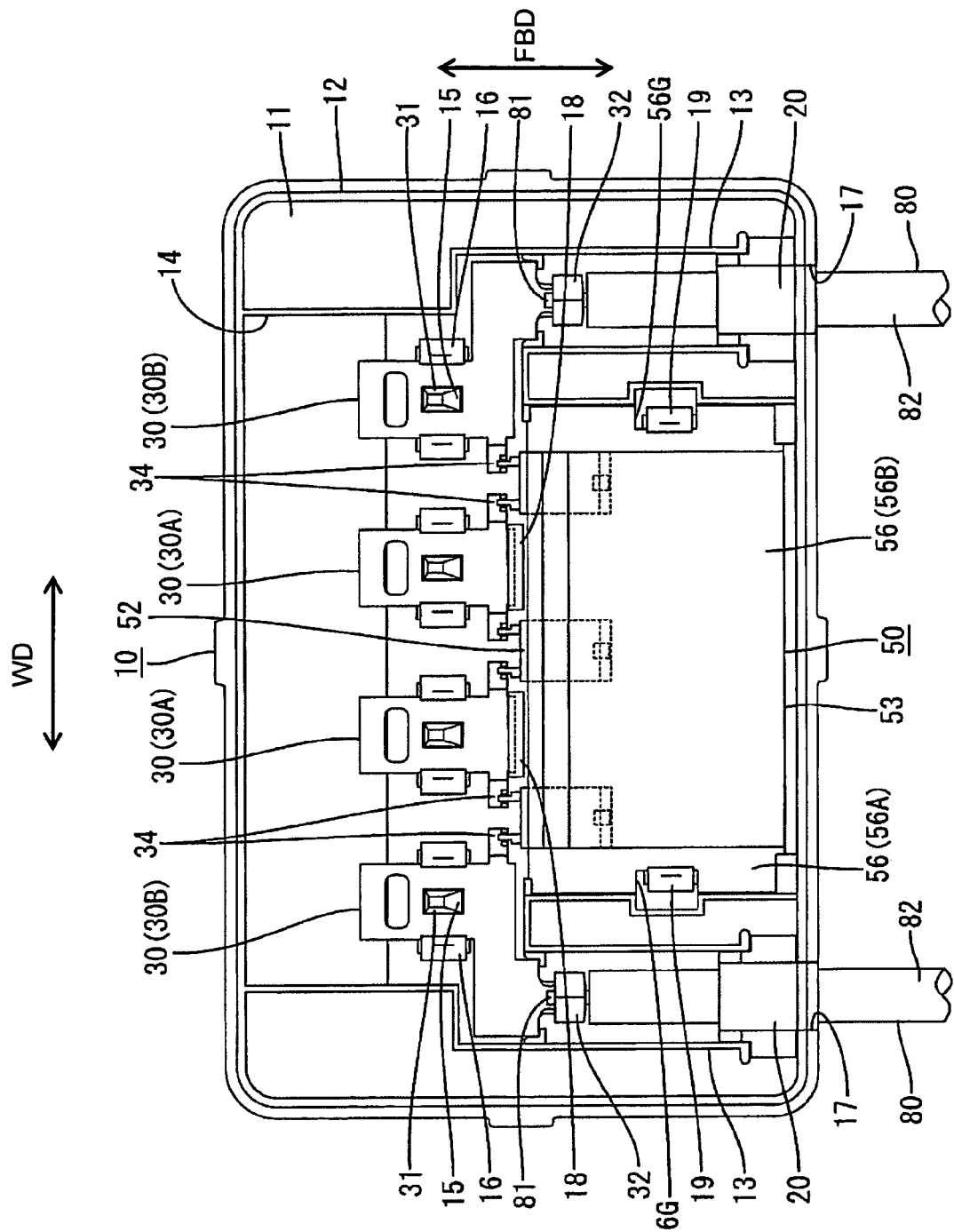
FIG. 8 is a plan view showing an internal construction of a box main body according to a second embodiment of the invention.

FIG. 8 shows a second embodiment of the invention. The second embodiment differs from the first embodiment in that one metal-made clip 53 holds a plurality of bypass diodes 52 collectively.

The clip 53 of the second embodiment is wider than the clip 53 of the first embodiment along the width direction WD to hold a plurality of bypass diodes 52 arranged side-by-side along the width direction WD, and includes a pair of wide supports 56. An area of the upper surface of a base plate 11 behind an intermediate portion with respect to forward and backward directions FBD and behind the arranged positions of terminal plates 30 serves as a placing surface on which the clip 53 is to be placed. Engageable portions 19 project at the substantially opposite sides of the placing surface.

A rectifying-device unit 50 is formed by holding a plurality of bypass diodes 52 resiliently between a pair of supports 56. The engageable portions 19 are fit resiliently into notches 56G of the lower supporting piece 56A in the process of placing the rectifying-device unit 50 on the base plate 11. The engageable portions 19 resiliently contact edges of the notches 56G as the rectifying-device unit 50 is placed on the base plate 11 to prevent upward movements of the rectifying-device unit 50 away from the base plate 11. The other construction is substantially similar to that of the first embodiment and no repeated description is given here. Several bypass diodes 52 are held collectively by one clip 53 according to the second embodiment. Thus, unlike the first embodiment, it is unnecessary to prepare one clip 53 for each bypass diode 52. Further, the bypass diodes 52 can be easily mounted.

Figure 9:
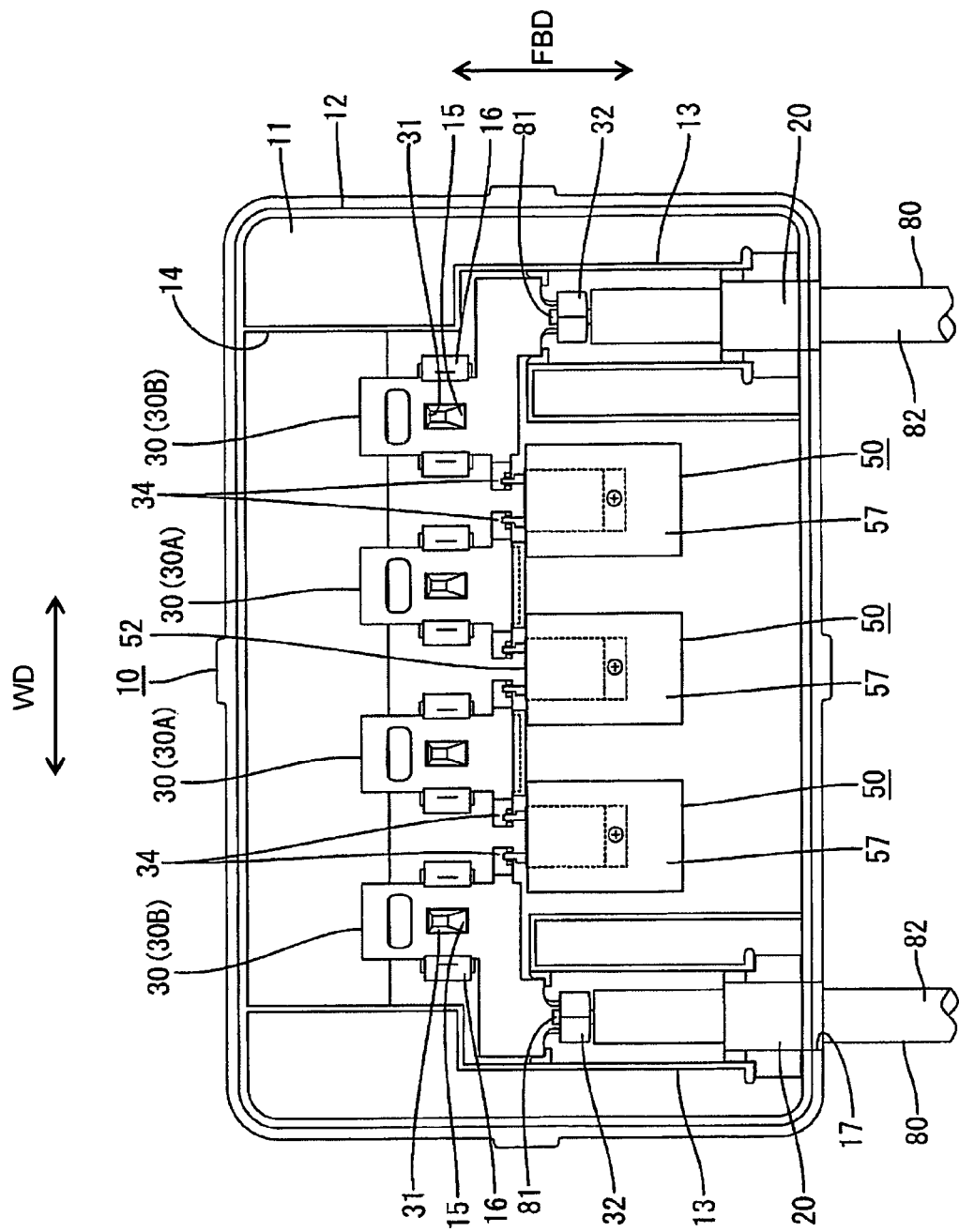
FIG. 9 is a plan view showing an internal construction of a box main body according to a third embodiment of the invention.
Figure 10:
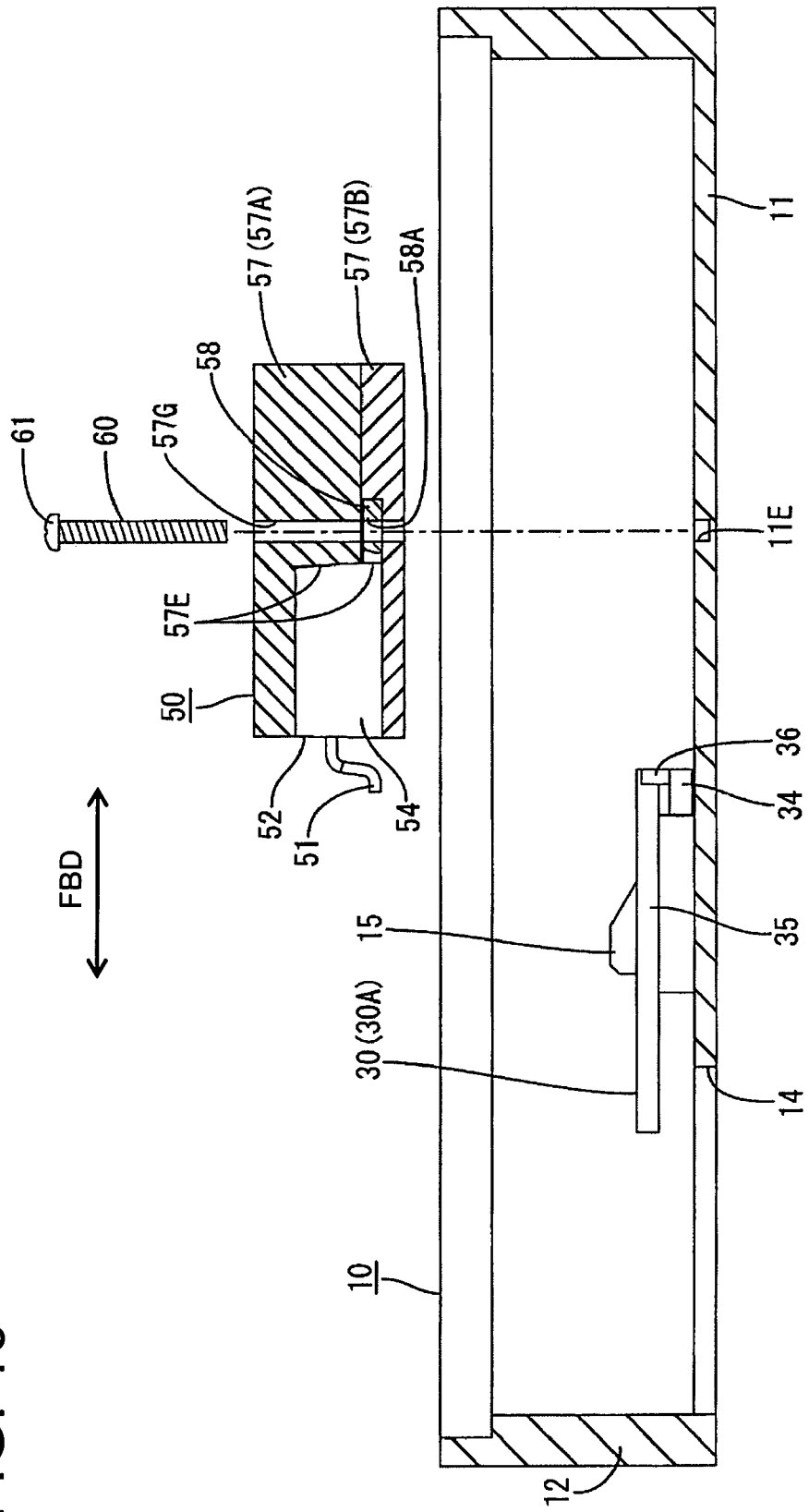
FIG. 10 is a schematic exploded section of the box main body.
Figure 11:
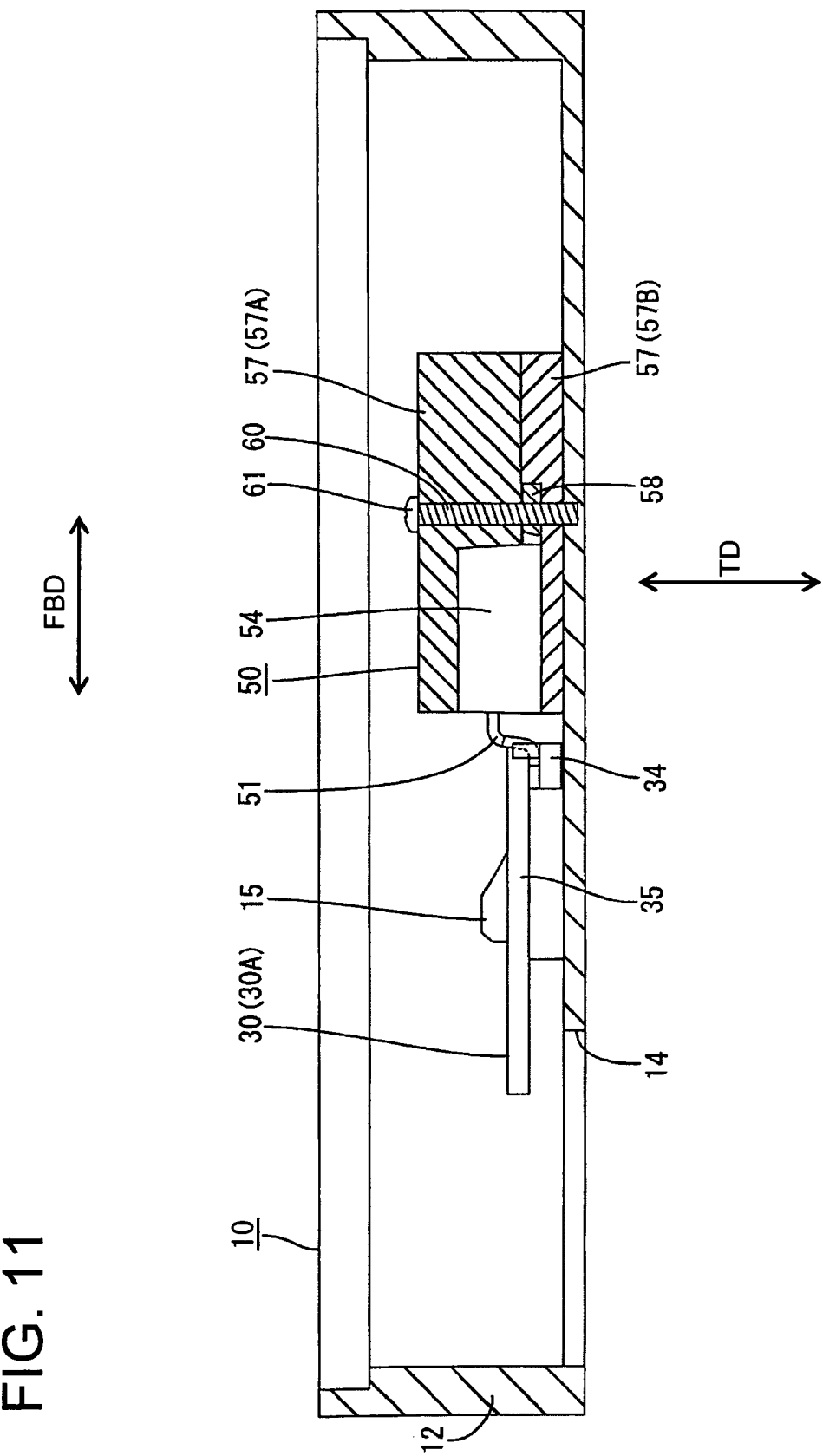
FIG. 11 is a schematic section of the box main body.

FIGS. 9 to 11 show a third embodiment of the invention. The third embodiment differs from the first and second embodiments in that two divided members 57 are used as the heat discharging member.

The two divided members 57 are blocks formed of a metal, preferably aluminum or a material having good heat transfer characteristics or conductivity. The divided members 57 are united and hold the bypass diode 52 tightly between the facing surfaces of the divided members 57 along thickness direction TD. Thus, one 57A of the two divided members 57 contacts a first surface of the bypass diode 52 and the other divided member 57B contacts a second and opposite surface of the bypass diode 52, as shown in FIG. 10.

The inner wall of the one divided member 57A has a holding surface 57E for closely contacting a right angle step between the upper surface and the rear surface of the resin-molded portion 54 of the bypass diode 52. The inner wall of the other divided member 57B has a holding surface 57E for closely contacting a right angle step between the bottom surface and the rear surface of a mount portion 58 that bulges out from the bypass diode 52. Boundary surfaces of the two divided members 52 are substantially horizontal and include the upper surface of the mount portion 58. The front surface of the resin-molded portion 54 of the bypass diode 52 is exposed without being covered by the two divided members 57, so that two conductor pieces 51 project out. The front surface of the resin-molded portion 54 and the front surfaces of the two divided members 57 are substantially flush and continuous with each other.

The joined divided members 57 define a substantially rectangular parallelepiped, and the length of the divided members along forward and backward directions FBD is greater than, preferably about twice, the length of the bypass diode 52 along forward and backward directions FBD. The two divided members 57 also are formed with through holes 57G that align coaxially when the two divided members 57 are joined. The through holes 57G communicate with a mount hole 58A formed in the mount portion 58 of the bypass diode 52. Accordingly, the two divided members 57 tightly hold the bypass diode 52. A screw 60 is inserted through the substantially coaxially arranged holes 57G, 58A. The leading end of the screw 60 is screwed into a bottomed internally threaded hole 11E in the base plate 11. Thus, the bypass diode 52 can be fastened between a head 61 of the screw 60 and the base plate 11 via the two divided members 57.

The rectifying-device unit 50 of the third embodiment tightly holds the bypass diode 52 between the divided members 57 and is placed on the base plate 11. The screw 60 then is inserted through the through holes 57G and the mount hole 58A and the leading end of the screw 60 is screwed into the internally threaded hole 11E of the base plate 11 to fix the rectifying-device unit 50 on the base plate 11 and the bypass diode 52 is held by the two divided members 57, as shown in FIG. 11. At this time, the holding surfaces 57E of the two divided members 57 extend along and contact the preexisting steps of the bypass diode 52. Thus, a heat discharging area is increased by as much as the contact of the two divided members 57 with the steps. Additionally, a joining strength of the bypass diode 52 and the two divided members 57 is increased. As a result, heat-discharging characteristics are better and the bypass diode 52 is held securely along thickness direction TD.

Further, the divided members 57 are made of metal, such as aluminum, with high heat conductivity. Thus, heat-discharging characteristics become even better.

Figure 12:
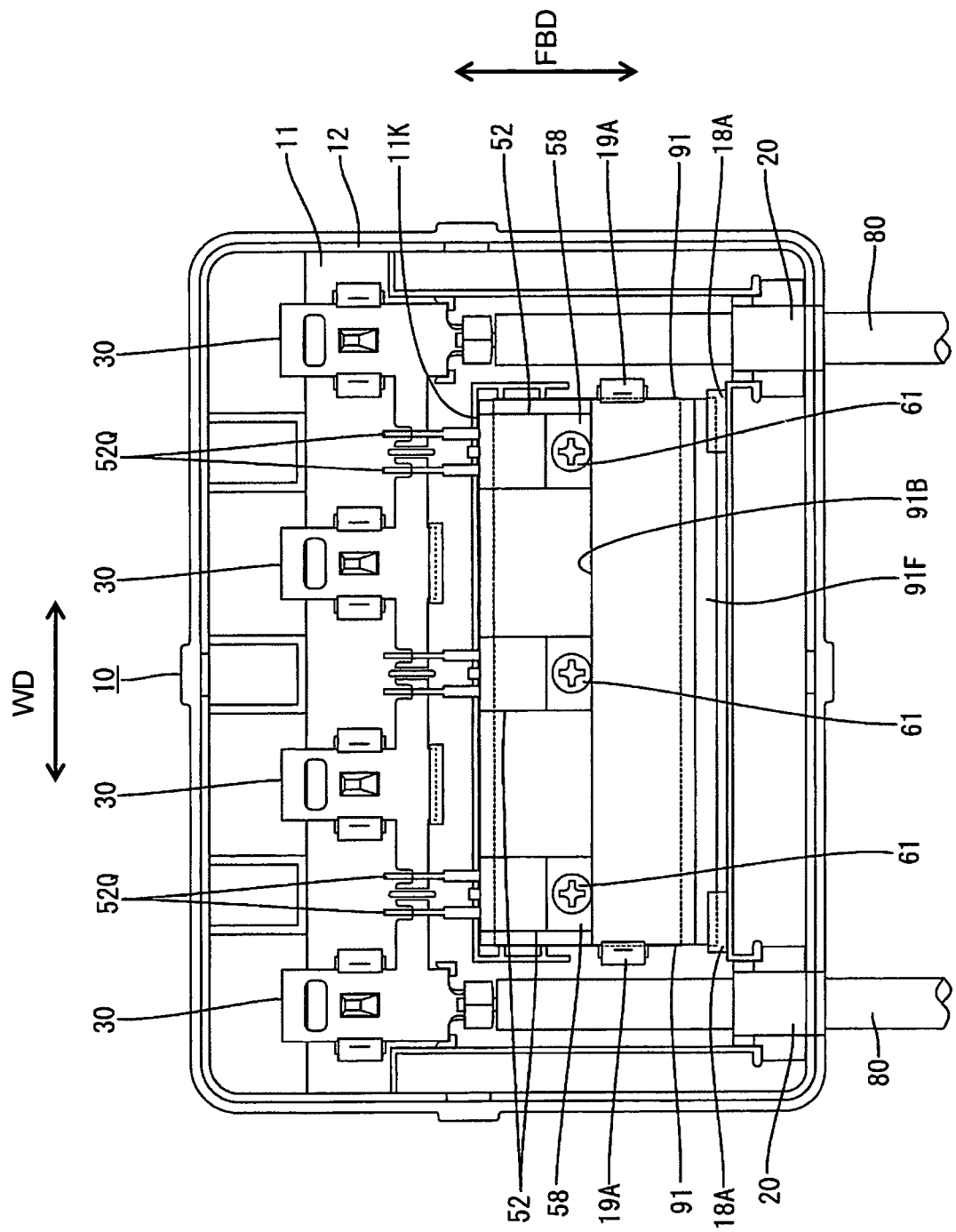
FIG. 12 is a plan view showing an internal constriction of a box main body according to a fourth embodiment of the invention.
Figure 13:
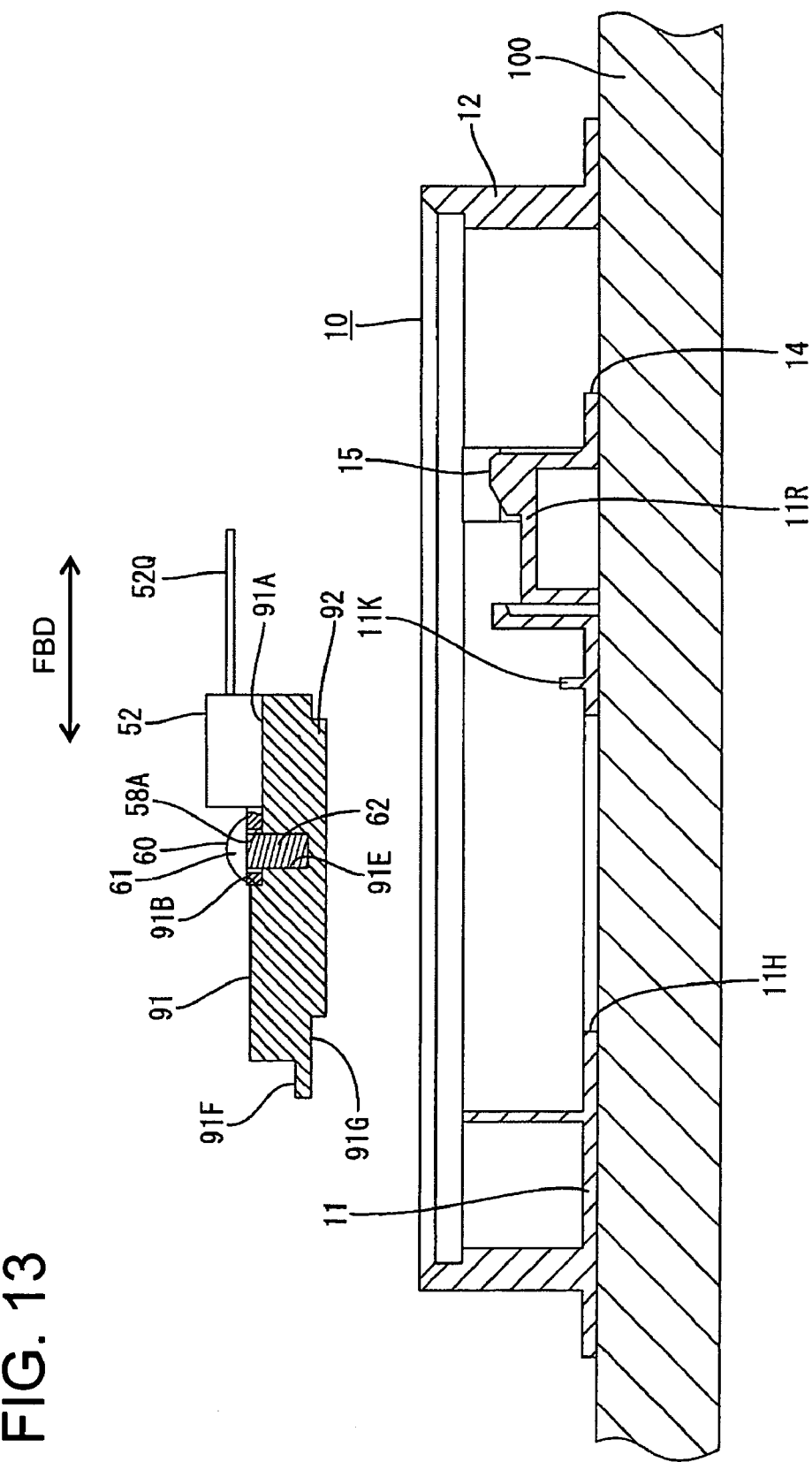
FIG. 13 is a schematic exploded section of the box main body.
Figure 14:
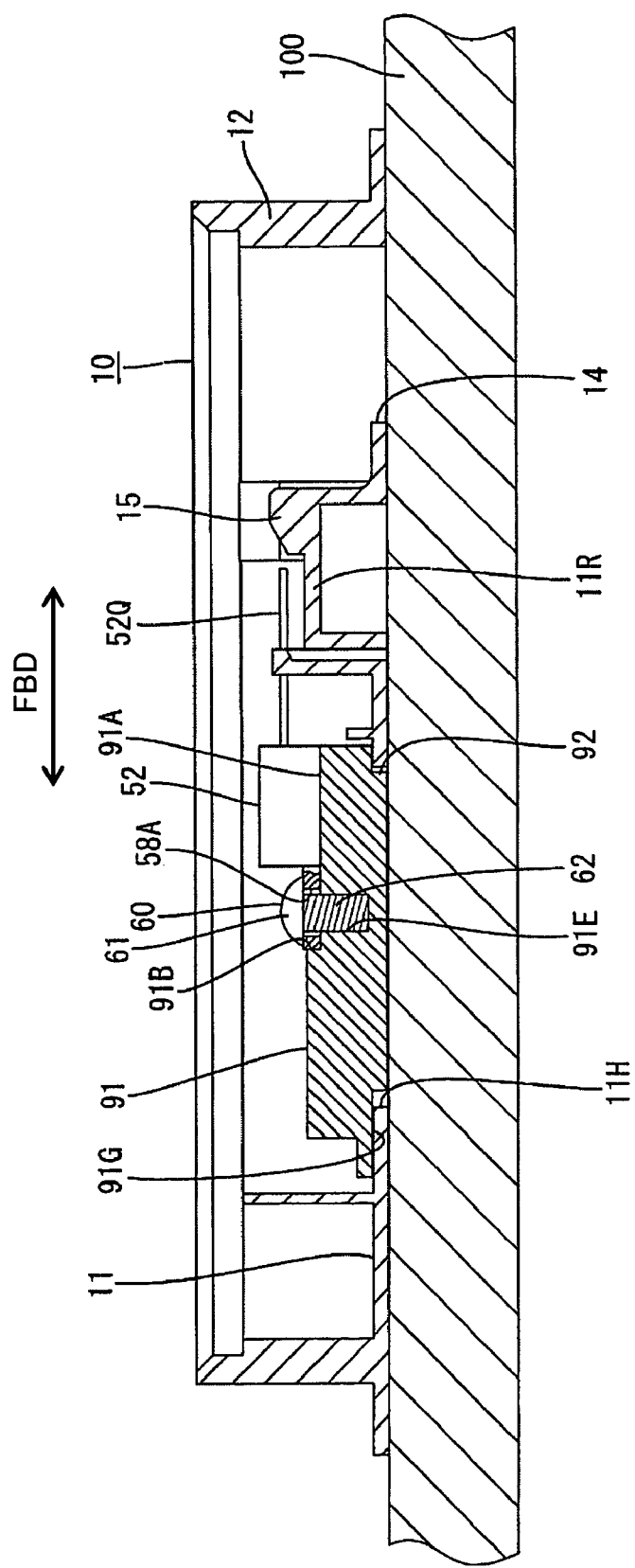
FIG. 14 is a schematic section of the box main body.

FIGS. 12 to 14 show a fourth embodiment of the invention. The fourth embodiment is similar to the third embodiment in that the bypass diode 52 is screwed to a metal block 91. However, the leading end of the screw 60 does not reach the base plate 11. Further, the fourth embodiment has no part corresponding to the one divided member 57A of the third embodiment.

The metal block 91 of the fourth embodiment is made of a material with a high thermal conductivity, such as aluminum or a copper-aluminum alloy. Bypass diodes 52 are arranged substantially side-by-side and are fixed collectively to the metal block 91. A placing surface 91A is defined on the front side of the upper surface of the metal block 91 for receiving the bypass diodes 52, as shown in FIG. 13. The placing surface 91 is slightly lower than a rear side of the upper surface of the metal block 91 to define a step 91B that extends substantially straight along the width direction WD. Mount portions 58 bulge out from the bypass diodes 52 and contact the step 91B to be positioned.

The front surfaces of the bypass diodes 52 are substantially flush and continuous with the front surface of the metal block 91 when the bypass diodes 52 are placed on the placing surface 91A of the metal block 91. Further, the front surface of the metal block 91 faces a restricting wall 11K that projects from the upper surface of the base plate 11. Thus, the metal block 91 is positioned with respect to the forward direction.

Each bypass diode 52 is mountable on the metal block 91 via the screw 60 inserted through the mount hole 58A in the mount portion 58. The mount hole 58A of the mount portion 58 aligns with a bottomed internally threaded hole 91E formed in the placing surface 91A of the metal block 91. A leading end 62 of the screw 60 is screwed into the internally threaded hole 91E from the mount hole 58A to hold the mount portion 58 between the head 61 of the screw 60 and the metal block 91. As a result, the bypass diode 52 is mounted on the metal block 91.

A thin protrusion 91F bulges out backward from the bottom edge of the rear end of the metal block 91. As shown in FIG. 12, two positioning walls 18A are provided on the upper surface of the base plate 11 substantially corresponding to the left and right edges of the protrusion 91F. The positioning walls 18A extend substantially along the width direction WD, and receiving grooves (not shown) are formed at the base ends of the these positioning walls 18A for receiving the left and right edges of the protrusion 91F. Further, the left and right edges 91ED of a main part of the metal block 91 are hooked by resiliently deformable resilient receiving portions 19A that project from the upper surface of the base plate 11. The resilient receiving portions 19A have a function similar to that of the engageable portions 19.

As shown in FIG. 13, the metal block 91 has a placing surface 91G and a heat-discharging block 92 projects down from the placing surface 91G towards the base plate 11 via steps at the bottom of the metal block 91. The base plate 11 has a through hole 11H that communicates with the underside of a solar battery module 100. The through hole 11H is configured to receive the heat discharging block 92 so that the heat-discharging block 92 is closely engageable with the edges of the through hole 11H along the width direction WD. A projecting distance of the heat-discharging block 92 is substantially equal to the thickness of the base plate 11, and a projecting end surface is near the bottom surface of the base plate 11 for direct contact with the underside of the solar battery module 100.

The bypass diodes 52 initially are placed on the placing surface 91A of the metal block 91 with the mount portions 58 thereof held in contact with the step 91B of the metal block 91. Subsequently, the screws 60 are screwed into the mount holes 58A of the mount portions 58 and the internally threaded holes 91E of the metal block 91 to fix the bypass diodes 52 to the metal block 91. The heat-discharging block 92 of the metal block 91 then is fit into the through hole 11H of the base plate 11 while the protrusion 91F of the metal block 91 is fit into the receiving grooves of the positioning walls 18A. Thus, the metal block 91 is held resiliently and is prevented from making upward movements away from the base plate 11 by the resilient receiving portions 19A of the base plate 11. Further, the conductor pieces 52Q that project substantially horizontally along the forward and backward directions FBD from the front end surface of each bypass diode 52 are placed on the attachment portions 34 of the corresponding terminal plates 30 when the metal block 91 is placed on the base plate 11. Soldering then is applied so that the conductor pieces 52Q and the attachment portions 34 are connected electrically. As shown in FIG. 14, a terminal mount 11R of the base plate 11 is raised from a reference surface of the base plate 11 to correspond to the height of the horizontally projecting pieces 52Q.

The bypass diodes 52 are screwed to the metal block 91 in the fourth embodiment. Thus, the bypass diodes 52 and the metal block 91 can be joined strongly. An effect brought about by such screwing is similarly displayed even in a mode where the metal block 91 has no heat discharging block 92 and the base plate 11 has no through hole 11H. Further, the third embodiment may be constructed so that the leading end of the screw 60 does not reach the base plate 11, but the positioning walls 18A and the resilient receiving portions 19A of the fourth embodiment are provided instead.

The base plate 11 is formed with the through hole 11H and the heat discharging block 92 of the metal block 91 can enter the through hole 11H. Thus, heat generated by the bypass diodes 52 can be discharged efficiently towards the solar battery module 100 via the heat-discharging block 92.

Further, the projecting end surface of the heat-discharging block 92 is at the bottom surface of the base plate 11. Thus, the heat generated by the bypass diodes 52 can be discharged directly from the heat-discharging block 92 towards the solar battery module 100.

Figure 15:
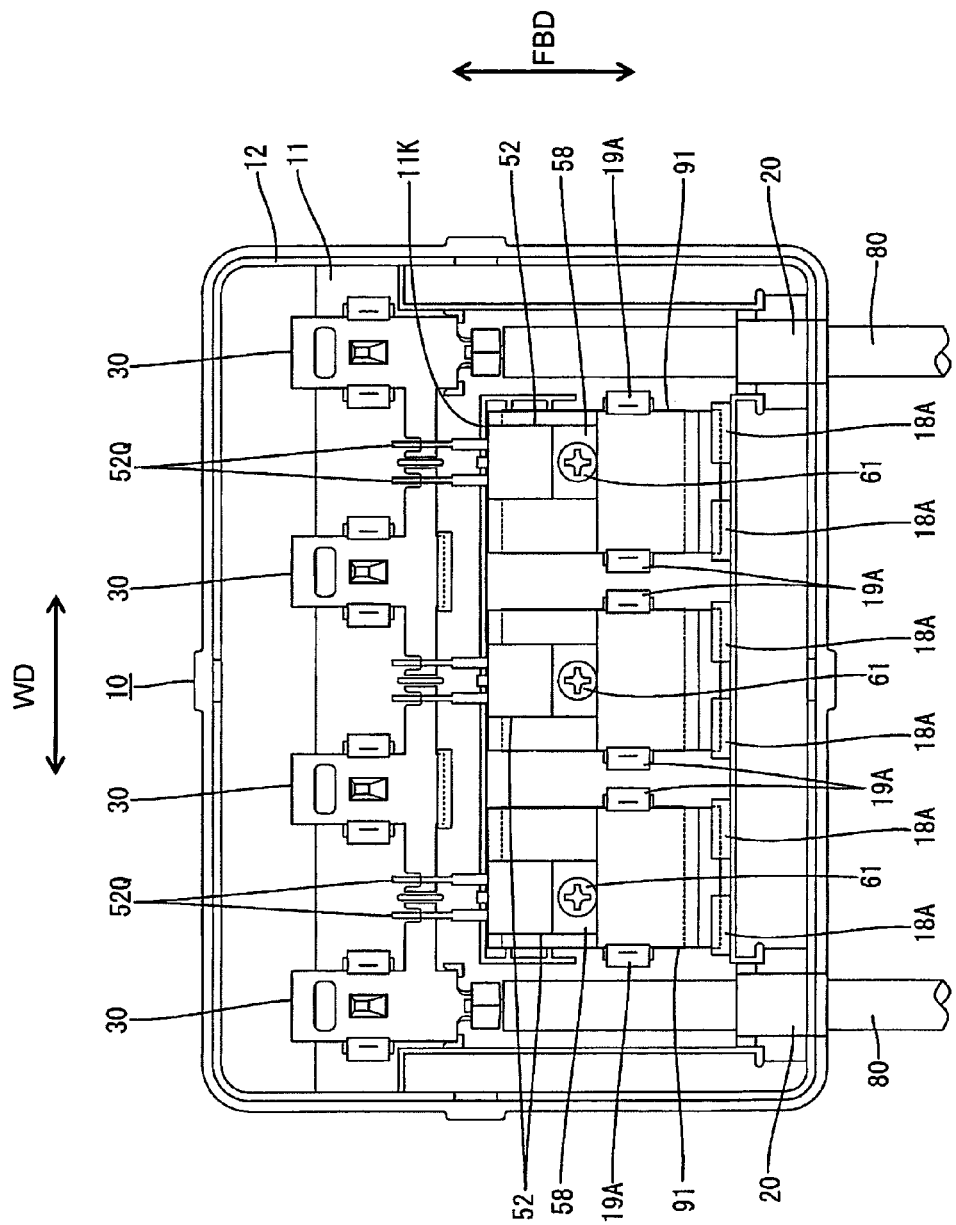
FIG. 15 is a view corresponding to FIG. 12 showing a modification.

As shown in FIG. 15, one metal block 91 may be provided for each bypass diode 52 using a technique similar to the application of the first embodiment to the second embodiment. Alternatively, one metal block 91 may be provided for one bypass diode 52 and the clips 53 of the first embodiment or pairs of the divided members of the third embodiment may be provided in correspondence with the other bypass diodes 52 to adopt a hybrid mode.

Figure 16:
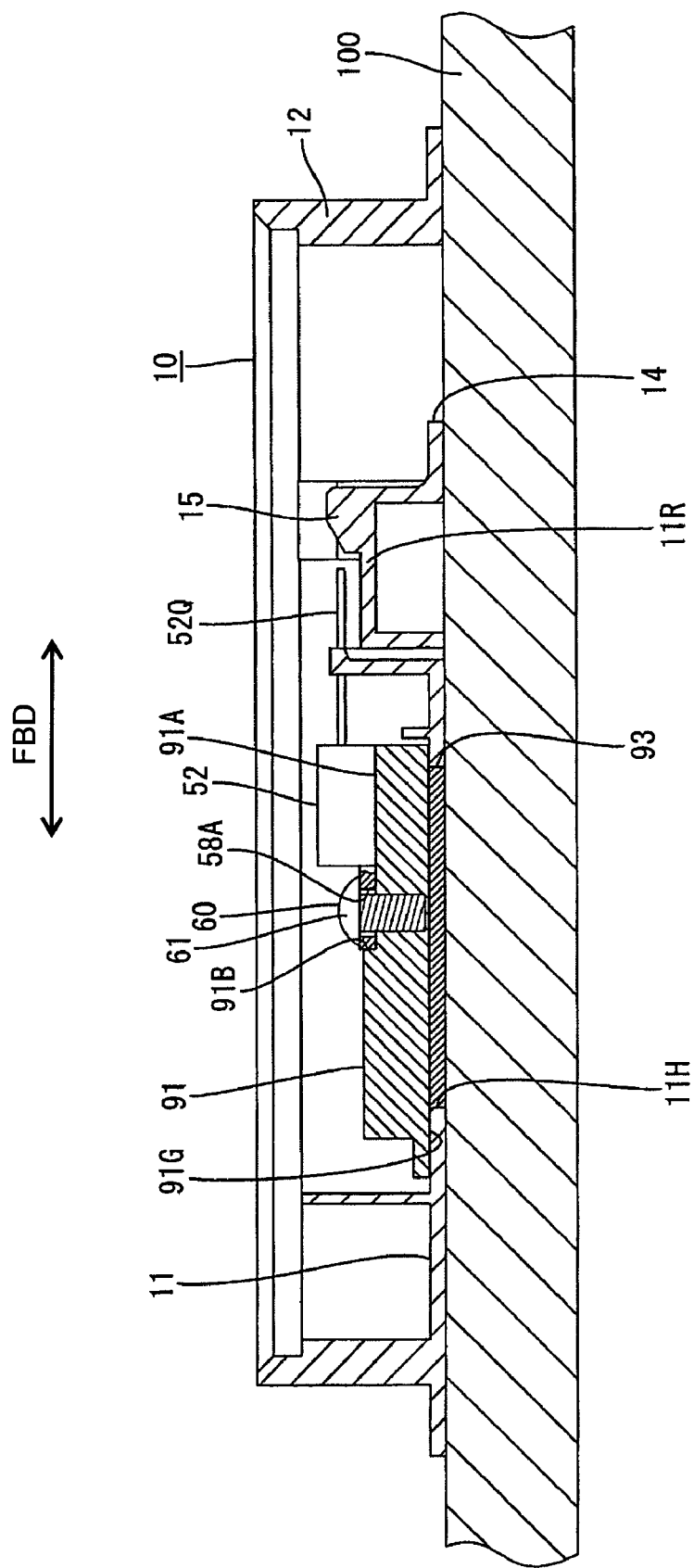
FIG. 16 is a schematic section showing a fifth embodiment.

FIG. 16 shows a fifth embodiment of the invention. The fifth embodiment is substantially identical to the fourth embodiment except that the metal block 91 is not formed integrally or unitarily with the heat discharging block 92 and a member different from the heat discharging block 92 is located in the through hole 11H of the base plate 11.

In the fifth embodiment, the bottom surface of the metal block 91 is a substantially flat surface extending substantially along the upper surface of the base plate 11. Accordingly, a surface contact can be achieved (directly or indirectly) between the metal block 91 and the base plate 11 thus leading to an improved heat exchange and dissipation away from the bypass-diode units 50. An adhesive 93 having a good heat conductivity, such as a ceramic adhesive, applied to the bottom surface of the metal block 91 is allowed to flow into the through hole 11H of the base plate 11 and to solidify therein. Thus, heat generated by the bypass diodes 52 is efficiently discharged toward the solar battery module 100 via the adhesive 93 having good heat conductivity.

The invention is not limited to the above described and illustrated embodiments. For example, the following embodiments also are embraced by the technical scope of the invention as defined by the claims. Beside the following embodiments, various changes can be made without departing from the scope and spirit of the invention as defined by the claims.

Although the clip resiliently holds the package-type diodes in the first two embodiments, it may resiliently hold bare chip diodes.

In the present invention, it is sufficient for the metal heat-discharging member to hold and contact the bypass diodes. For example, a bag-shaped metal heat-discharging member may wrap and contact the bypass diodes.

The through holes are formed to communicate with the mount hole of the bypass diode in the third embodiment. However, it is sufficient for the through holes to penetrate the two divided members without communicating with the mount hole according to the invention. Of course, if the through holes communicate with the mount hole, the bypass diode can be held more securely since the screw is inserted through the mount hole.

The heat-discharging member has a pair of divided members in the third embodiment. However, it may be one inseparable block body having a mounting portion for the bypass diode. For example, the block body may be a lower block body that contacts only the bottom surface of the bypass diode or an upper block body that contacts only the upper surface of the bypass diode. Alternatively, the block body may have a U-shaped mounting portion capable of accommodating the bypass diode. In this case, the respective block bodies are preferably made of aluminum or an aluminum alloy.

It is sufficient for the heat-discharging member to be mountable to the bypass diode using an existing part of the bypass diode, such as a step or mount hole of the third embodiment. Alternatively, the block bodies may have bosses insertable into the mount holes of the bypass diodes, and may be joined with the bypass diodes using these bosses.

The heat-discharging member may have a fin for discharging heat generated by the bypass diode towards the solar battery module. The fin can be formed, for example, by embossing one surface of the heat-discharging member. This increases a heat discharging outer surface area and results in a better airflow. Thus, a temperature increase of the bypass diode can be suppressed more efficiently.

What is claimed is:

1. A terminal box for a solar battery module, comprising:

a base plate, a plurality of terminal plates on the base plate and connectable with positive and negative electrodes of the solar battery module via cables for external connection; and a rectifying-device unit spanning between two of the terminal plates, the rectifying-device unit including at least one rectifying device connectable with each of the two terminal plates spanned by the rectifying-device unit, and a heat discharging member disposed and configured for holding the rectifying device in contact with the heat discharging member, the heat discharging member including at least one engaging portion resiliently engageable with at least one engageable portion of the base plate, and the rectifying-device unit is positionable on the base plate by the resilient engagement of the engaging portion and the engageable portion.

2. The terminal box of claim 1, wherein the rectifying device is packaged by resin sealing with a heat discharging portion exposed at its outer surface, and the heat discharging member engageable with the heat discharging portion.

3. The terminal box of claim 1, wherein plural rectifying devices are provided on the base plate and plural heat discharging members are provided so that one of the heat discharging members is provided for each rectifying device.

4. The terminal box of claim 1, wherein the heat-discharging member is made of aluminum or an aluminum alloy.

5. A terminal box for a solar battery module, comprising:

a base plate, a plurality of terminal plates on the base plate and connectable with positive and negative electrodes of the solar battery module via cables for external connection; and a rectifying-device unit spanning between two of the terminal plates, the rectifying-device unit including at least one rectifying device connectable with each of the two terminal plates spanned by the rectifying-device unit, and a heat discharging member, wherein the heat discharging member includes an intermediate coupling and a pair of opposed supporting pieces extending from the intermediate coupling for resiliently holding the at least one rectifying device therebetween.

6. The terminal box of claim 5, wherein the rectifying device is packaged by resin sealing with a heat discharging portion exposed at its outer surface, and the heat discharging member engageable with the heat discharging portion.

7. The terminal box of claim 5, wherein plural rectifying devices are provided on the base plate, and plural heat discharging members are provided so that one of the heat discharging members is provided for each rectifying device.

8. The terminal box of claim 5, wherein the heat-discharging member is made of aluminum or an aluminum alloy.

* * * * *